(12) United States Patent
Henrion (10) Patent No.: US 7,330,475 B2
(45) Date of Patent: Feb. 12, 2008

(54) METHOD FOR SHARING THE BANDWIDTH AVAILABLE FOR UNICAST AND MULTICAST FLOWS IN AN ASYNCHRONOUS SWITCHING NODE

(75) Inventor: Michel Henrion, Boulogne-Billancourt (FR)

(73) Assignee: Alcatel, Paris (FR)

( * ) Notice: Subject to any disclaimer, the term of this patent is extended or adjusted under 35 U.S.C. 154(b) by 1014 days.

(21) Appl. No.: 10/411,140

(22) Filed: Apr. 11, 2003

(65) Prior Publication Data

US 2004/0085960 A1    May 6, 2004

(30) Foreign Application Priority Data

Apr. 15, 2002    (FR) .................... 02 04679

(51) Int. Cl.
  H04L 12/28    (2006.01)
  G01R 31/08   (2006.01)
  H04J 3/16     (2006.01)
(52) U.S. Cl. ............... 370/410; 370/389; 370/395.21; 370/235; 370/468
(58) Field of Classification Search ............... 370/390, 370/389, 395.2, 395.21, 395.4, 395.42, 397, 370/468, 410, 419, 412, 413, 473, 474
See application file for complete search history.

(56) References Cited

U.S. PATENT DOCUMENTS 6,956,859 B2 * 10/2005 Davis .................... 370/397
7,042,883 B2 * 5/2006 Fan et al. ............... 370/395.4
7,130,301 B2 * 10/2006 Benayoun et al. .......... 370/389

FOREIGN PATENT DOCUMENTS

EP    0 678 996 A2    10/1995

OTHER PUBLICATIONS

Worster T et al: "Buffering and Flow Control for Statistical Multiplexing in an ATM Switch" ISS '95 World Telecommunications Congress. (International Swtiching Symposium). Advanced Switching Technologies for Universal Telecommunications at the Beginning of the 21st Century. Berlin, Apr. 23-28, 1995, Proceedings of the International Swit, vol. 1, Symp. 15, Apr. 23, 1995, pp. 273-277, XP000495578.

(Continued)

Primary Examiner—Hanh Nguyen
(74) Attorney, Agent, or Firm—Sughrue Mion, PLLC (57) ABSTRACT

In an asynchronous switching node, n1 input modules and n2 output modules are interconnected by an asynchronous cell switching network. The network routes a cell transmitted by an input module to an output module, in the case of a cell of a unicast flow; the network routes a cell transmitted by an input module to N output modules in the case of a cell of a multicast flow, by generating itself the N copied cells from the transmitted cell. A flow control mechanism is designed to share the bandwidth available for each pair of an input module and an output module, based on the bandwidth requests of unicast flows for each module pair. In each input module, the bandwidth request of each individual multicast flow is converted into N bandwidth requests associated with N equivalent virtual unicast flows associated with this multicast flow.

6 Claims, 5 Drawing Sheets

OTHER PUBLICATIONS

Kirstadter A: "Fair and flexible contention resolution for input buffered ATM switches based on LAN medium access control protocols" Broadband Communications. Global Infrastructure for the Information Age. Proceedings of the International IFIP-IEEE Conference on Broadband communications, Canada, 1996, London, Chapman and Hall, GB, Apr. 23, 1996, pp. 370-381, XP010525736.

* cited by examiner

FIG_1 RELATED ART

FIG_2 RELATED ART

FIG_3 RELATED ART

FIG_4 RELATED ART

FIG_5

FIG_6

METHOD FOR SHARING THE BANDWIDTH AVAILABLE FOR UNICAST AND MULTICAST FLOWS IN AN ASYNCHRONOUS SWITCHING NODE

BACKGROUND OF THE INVENTION

1. Field of the Invention

The present invention concerns a method for sharing the switching bandwidth available for transferring cells of unicast and multicast flows in an asynchronous switching node.

2. Description of the Related Art

Figure 1:
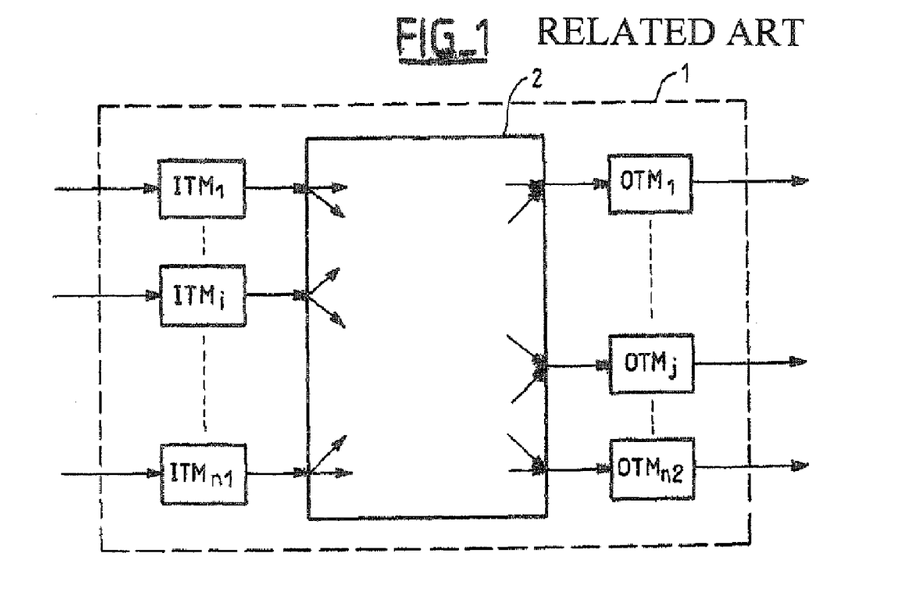
FIG. 1 is a schematic diagram illustrating the principle of a switching node for implementing the method according to the invention.

As shown in FIG. 1, such a switching node 1 includes a plurality ($n_1$) of input terminal modules or input modules, $ITM_1, \ldots, ITM_i, \ldots, ITMn_1$, which are interconnected with a plurality of n2 output terminal modules, or output modules, $OTM_1, \ldots, OTM_j, \ldots, OTMn_2$, via an asynchronous switching network 2, according to a conventional arrangement. This type of separate representation of $n_1$ input modules and $n_2$ output modules can reflect either an implementation in which the input and output modules are physically separated, or a logical separation of two types of functions, input and output, implemented in mixed terminal modules combining these two types of functions, in which case the numbers $n_1$ and $n_2$ of modules are generally equal.

This switching node is used to transfer a data block received in an input module of any rank i, $ITM_i$, to at least one output module of any rank j, $OTM_j$, via its switching network 2 according to an internal routing mode of whatever type, for example the type without connection or with connection. A block of external data received on an incoming port of an input module can be switched to leave on an outgoing port of a given output module; in this case such a data block is referred to as a "unicast" data block; it can also be switched by the network 2 to leave on outgoing ports of a plurality of different output modules; in that case such a data block is referred to as "multicast".

According to known techniques, the external data blocks which are received in the form of variable length packets are converted into cells of internal format in the input modules, typically by packet segmentation. Once transferred to the recipient output modules via the switching network, the cells of internal format are converted back into external data blocks, cells or packets, typically by cell reassembly in the case of external data blocks to be transmitted in the form of variable length packets. Within the switching node, regardless of the type of external data blocks, the asynchronous switching network in question then switches cells of internal format, each cell being transferred from an incoming module to at least one recipient output module. Hereafter, only these cells of internal format are considered, in so far as the problem of the invention concerns the internal transfer of these cells in the switching node and not the external data blocks.

In the input modules of this node, two types of cells to be transferred via the cell switching network 2 are considered: a first type of cell called unicast, UC, which must be routed to a single given recipient output module, and a second type of cell called multicast, MC, which must be routed to a plurality of N given recipient output modules among the n2 output modules of the node (where $1 < N \leq n2$).

In the case of multicast cells, to perform the required transformation of such a cell into N cells to be delivered to each of N recipient output modules, two conventional methods are known:
- the first method consists in generating N copies of a multicast cell in the input module, in such a way that the latter transmits to the switching network N unicast cells, each intended for one of the N recipient output modules required for this multicast cell;
- the second method consists in transmitting to the switching network, from the input module, a single copy of the multicast cell MC, the switching network then itself able to generate, according to a known technique, the N copied cells UCa, . . . , UCn from one multicast cell while routing each of these N copied cells to deliver them to each of the N recipient output modules required for this multicast cell.

The invention concerns this second method.

Figure 2:
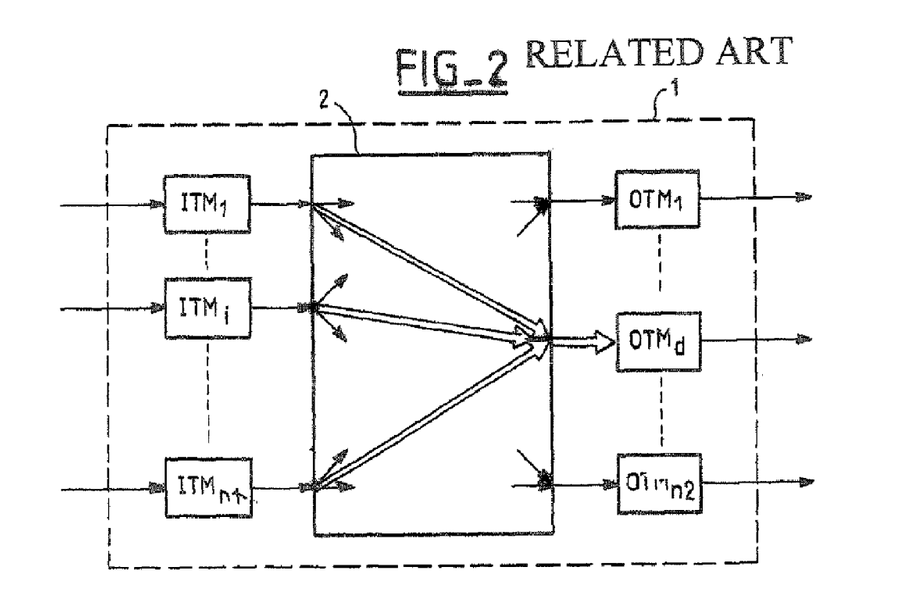
FIG. 2 is a schematic diagram illustrating outgoing flows of cells delivered to a given output module, from various input modules, in a switching node such as the one illustrated in FIG. 1.

FIG. 2 illustrates outgoing flows of cells delivered to a given output module OTMd, coming from various input modules ITM1, . . . , ITMn1 in the switching node 1. The flows of cells transferred via the switching network run the risk of creating congestion in this network each time the overall rate of the traffic of cells delivered to an output module, such as OTMd, becomes excessive in respect of the bandwidth allowed to access this output module, in so far as the capacity for transferring cells via the switching network is physically limited by characteristics specific to this network.

To avoid such a congestion situation in the switching network, the conventional provision is to regulate, in each input module, the transfer rates of cells to each output module of the node, in such a way that the overall rate of traffic of cells delivered to each output module is not excessive.

Figure 3:
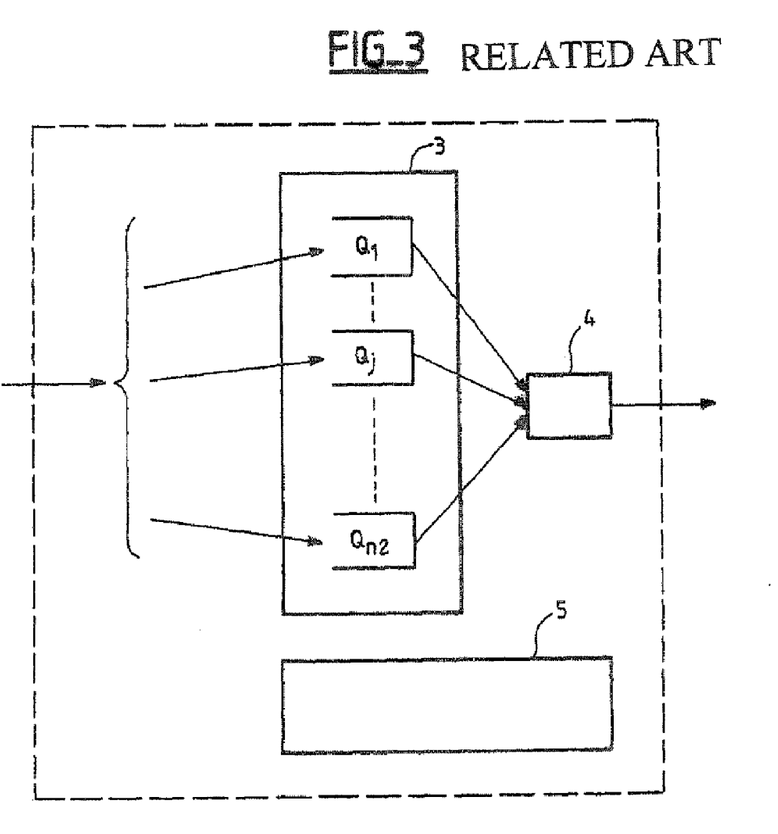
FIG. 3 is a schematic diagram illustrating the principle of an input module of the switching node of FIGS. 1 and 2.

To this end, according to a known technique, each input module, as illustrated in FIG. 3, is equipped with buffer stores 3 for temporarily storing cells, and these buffer stores are structured as a plurality of queues $Q1, \ldots, Qj, \ldots, Qn2$ which are managed respectively for each outgoing cell flow corresponding to the subset of cells delivered, by the switching network, to a given output module.

According to this technique used in such an input module ITMi, after processing by known functions of the input interface and for converting into internal cells (not represented in FIG. 3), the cells are distributed to the various queues, such as $Q1, \ldots, Qj, \ldots, Qn2$, according to their recipient output module OTM1, . . . , OTMj, . . . , OTMn2. To output a cell from a queue and transmit it to the switching network, a queue multi-server 4 uses one if its service cycles to read the corresponding data in the queue and extract the data from it. Such a queue multi-server distributes its service cycles to the various queues, proportionally to the cell service rate GOCRj attributed to each queue Qj to transfer cells intended for the corresponding output module OTMj. Operation of all the queues of an input module is controlled by a queue management unit 5, in this case assumed to be assigned to this input module, as illustrated schematically in FIG. 3. This queue management unit controls the departure of cells stored in the buffer stores to the switching network at service times according to a cell service rate attributed to each of the cell flows.

The composition of the output modules of the node 1 is not detailed here in so far as each output module can be implemented in the conventional way, with a plurality of registers or stores for receiving data blocks, converting them into internal cells and then transmitting these cells to the output interface functions of this input module. The composition of buffer memories, the queue multiserver or the queue management unit is also not detailed and can involve hardware means (in particular processors and memories), and software means that are appropriate and known per se.

Figure 4:
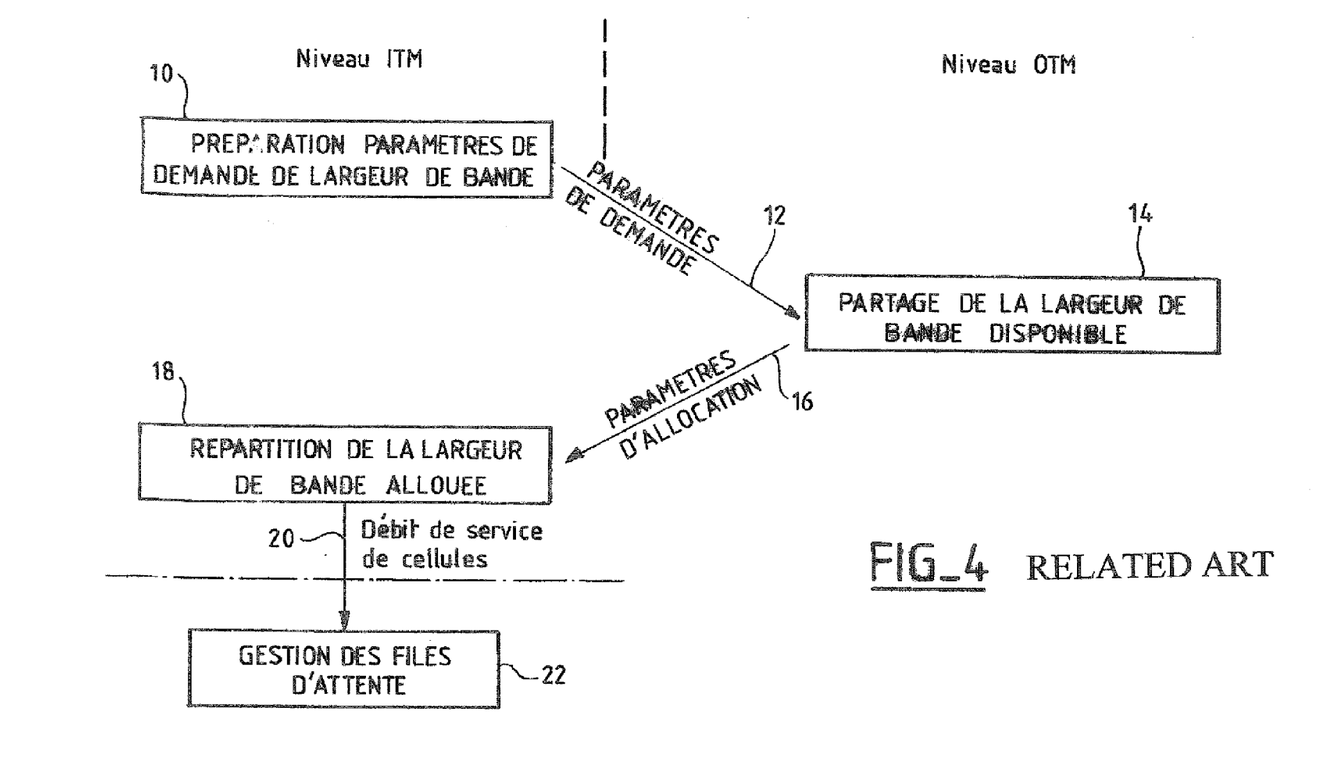
FIG. 4 is a flowchart of the steps implemented for the sharing of the bandwidth available for unicast flows, in the switching node of FIGS. 1 to 3.

FIG. 4 is a flowchart of the steps implemented for the sharing of the bandwidth available for unicast flows in the switching node of FIGS. 1 to 3. FIG. 4 taken as a whole is representative of a mechanism for controlling flows inside the switching node; such a flow control mechanism is described in an article entitled "Buffering and Flow Control for Statistical Multiplexing in an ATM Switch" by T. WORSTER & al, which was published in April 1995 in volume No. 1 pages 273-277 of the report of the International Switching Symposium ISS 95.

According to the method described, to dynamically achieve a sharing of the overall switching bandwidth available at a node, the following is required:

an evaluation of the volume of queuing traffic stored temporarily in input queues which each input module includes, for each of the output modules likely to be recipients in relation to it;

a determination, according to the volume of queuing traffic observed, of a parameter called bandwidth request, for each pair made up of a given input module and a given recipient output module;

a collection of these bandwidth request parameters concerning each recipient output module, at the various input modules;

for each output module, sharing of the switching bandwidth available toward this recipient output module, according to these various bandwidth request parameters relating to the various input modules;

delivery to each input module of a bandwidth allocation parameter, for each of the pairs of modules that it forms with the various output modules of the node.

By implementing such a method at the level of an internal flow control mechanism of an asynchronous switching node, the available switching bandwidth can be shared, based on the bandwidth request parameter values determined according to the volume of queuing traffic observed at the queues of the input modules of the node.

Such a flow control mechanism is based on the use, from the point of view of traffic, of a virtual ingress/egress pipe concept, VIEPi/j, for each pair (ITMi, OTMj) of an input module ITMi and an output module OTMj.

In the left part of FIG. 4, the steps implemented at input module level are shown, and in the right part of the figure, the available bandwidth sharing step implemented at output module level, or in a more centralized manner, is represented.

The first step 10, implemented by the flow control mechanism in each input module ITMi, is a step for preparing a bandwidth request parameter BRi/j, for each pair (ITMi, OTMj) made up of this input module ITMi and an output module OTMj. For each given pair (ITMi, OTMj), this step consists in accumulating the various individual bandwidth requests U-BR[i/j]p of each of the different unicast flows UF[i/j]p present in the input module ITMi and intended for the output module OTMj of this module pair.

For each unicast flow UF[i/j]p present in the input module ITMi, the individual bandwidth request parameter U-BR[i/j]p can for example have a value which is determined according to the number of cells belonging to flows that are stored in the buffer memories of the input module. Other forms of bandwidth request can also be used, for example that for which the value is determined according to the relative weight of priority associated with each of the flows, as described in French patent application No 01 12446 filed on Sep. 27, 2001.

This first step 10 thus provides, for all the module pairs (ITMi, OTMj), bandwidth request parameters BRi/j per module pair. These parameters are provided as the input to the second step 14 in FIG. 4, as symbolized in the figure by the arrow 12.

The second step 14, implemented by the flow control mechanism for each given output module OTMj, is a step for sharing, according to the bandwidth request parameters BRi/j per module pair that were established during the first step, the bandwidth available for accessing this given output module, that is to say for the cell traffic of all unicast flows concerning the various module pairs (ITMi/OTMj) having this same given output module OTMj as recipient. This sharing step is relative to each output module, but it can also be performed physically at each output module, or at a more centralized level. This second step provides, for each of the virtual ingress/egress pipes VIEPi/j, a bandwidth allocation parameter BGi/j per module pair. For the module pairs (ITMi, OTMj) corresponding to this virtual pipe, this bandwidth allocation parameter per pair can be used to regulate the transfer of cells from all unicast flows associated with this module pair, that is to say coming from the input module ITMi and intended for the output module OTMj.

The third step symbolized in FIG. 4 by the arrow 16 is a step for supplying, to each of the input modules ITMi, various bandwidth allocation parameters BGi/j related to the module pairs (ITMi/OTMj) having this input module as source. At the end of this third step, an input module ITMi therefore has parameters BGi/j for allocating bandwidth toward each output module OTMj for which the input module had delivered, during the first step, a bandwidth request parameter BRi/j for the corresponding module pair (ITMi, OTMj). A bandwidth allocation parameter BGi/j between an input module ITMi and an output module OTMj corresponds, in terms of traffic, to the conceptual modeling of a virtual ingress/egress type VIEPi/j between the input module ITMi and the output module OTMj.

The fourth step, symbolized by the reference 18 in FIG. 4, is a step for distributing the bandwidth allocated per module pair, which step is performed at the level of each input module ITMi. From each of these parameters of bandwidth allocation BGi/j per module pair (ITMi, OTMj), this allocated bandwidth is distributed by determining the individual bandwidth allocation U-BG[i/j]p for each of the unicast flows UF[i/j]p associated with this module pair (ITMi, OTMj). This individual allocated bandwidth U-BG[i/j]p forms the cell service rate SSR[i/j]p attributed to each of these flows.

FIG. 4 shows also by the arrow 20, the provision of various cell service rates SSR[i/j]p attributed to each of the flows. These different cell service rates are delivered to the queue management unit 5 of FIG. 3, to control the respective order of cells from different flows in the queues 3, as symbolized by the reference 22 in FIG. 4. The dash-dotted line in FIG. 4, between the distribution step referenced 18 and the queue management step 22, indicates that this queue management step 22 is not part of the flow control mechanism.

The flow control mechanism of FIG. 4 is designed to regulate the traffic of flows of unicast cells, which are well suited to processing by module pair (ITMi, OTMj) according to virtual ingress/egress type concept VIEPi/j. However it does not apply to flows of multicast cells, given their plurality of recipient output modules which is not compatible with the concept of virtual ingress/egress pipe per module pair. There is therefore a need for a method for sharing the switching bandwidth available for transferring cells of unicast and multicast flows in an asynchronous switching node.

SUMMARY OF THE INVENTION

Hence the invention proposes a method for sharing the switching bandwidth available for transferring cells of unicast and multicast flows in an asynchronous switching node, in which method n1 input modules ITM1, . . . , ITMi, . . . , ITMn1 are interconnected with n2 output modules OTM1, . . . , OTMj, . . . , OTMn2 by a cell switching network which transfers each cell from an input module to at least one output module;

said switching network routes a cell transmitted by an input module to a single given recipient output module OTMd in the case of a cell of a unicast flow UF, and to N given recipient output modules OTMa, . . . , OTMn, among the n2 output modules of the node, in the case of a cell of a multicast flow MF, this network itself generating the corresponding N copied cells from the cell transmitted by an input module for the multicast flow;

each input module is equipped with buffer stores for temporarily storing cells of said unicast and multicast flows, and the departure of these stored cells from buffer stores to said switching network is controlled at service times that depend on a cell service rate attributed to each of the flows of cells.

An internal flow control mechanism performs a first step for preparing a bandwidth request parameter BRi/j for each of the module pairs ITMi/OTMj relating to a given input module ITMi and a given output module OTMj, by cumulating the various individual bandwidth requests U-BR[i/j]p of the various unicast flows UF[i/j]p associated with this module pair, then a second step for sharing, for each given output module OTMj, the bandwidth available for the cell traffic from all the unicast flows having this same given output module OTMj as recipient, according to the respective bandwidth request parameters BRi/j prepared for the various module pairs ITMi, OTMj having this same given output module OTMj as recipient, then a third step for supplying, to each of the input modules ITMi and for each of the module pairs ITMi/OTMj, a bandwidth allocation parameter BGi/j, and finally a fourth step for distribution, for each of the module pairs ITMi, OTMj, determining, based on the bandwidth allocation parameter BGi/j for this pair, the individual bandwidth allocation U-BG[i/j]p distributed for each of the unicast flows UF[i/j]p associated with this pair, this bandwidth allocation U-BG[i/j]p forming said cell service rate SSR[i/j]p attributed to each of these flows.

According to the method of the invention, the transfer of a cell of a multicast flow MF[i/a . . . n]q via the switching network to N given recipient output modules OTMa, . . . , OTMn, is considered as being equivalent to the simultaneous transfer of N cells of N respective virtual unicast flows VUF[i/a]q, . . . , VUF[i/n]q to these same N recipient output modules OTMa, . . . , OTMn; therefore the method additionally includes a step for converting before the first step, in each of the input modules ITMi, the individual bandwidth request M BR[i/a . . . n]q of each multicast flow MF[i/a . . . n]q to N individual bandwidth requests VU-BR[i/a]q, . . . , VU-BR[i/n]q associated with said N equivalent virtual unicast flows VUF[i/a]q, . . . , VUF[i/n]q associated with this multicast flow.

The first step for preparing, for each of the module pairs ITMi, OTMj, a bandwidth request parameter BRi/j is performed therefore by then cumulating the individual bandwidth requests U-BR[i/j]p of the various real unicast flows UF[i/j]p associated with this module pair, and the individual bandwidth requests VU-BR[i/j]q converted for the various virtual unicast flows VUF[i/j]q, also associated with this module pair.

The internal flow control mechanism can then perform the second step of sharing and third step of supplying, based on bandwidth request parameters BRi/j and bandwidth allocation parameters BGi/j, per module pair ITMi/OTMj, thus obtained.

The fourth step of distribution of the internal flow control mechanism, then determines, based on each of the bandwidth allocation parameters BGi/j per module pair, the individual bandwidth allocation U BG[i/j]p distributed for each of the real unicast flows UF[i/j]p associated with this pair, and the individual bandwidth allocation VU-BG[i/j]q distributed for each of the virtual unicast flows VUF[i/j]q, also associated with this module pair, which correspond to multicast flows MF[i/a . . . n]q having the output module OTMj of this pair among its N recipient output modules.

The method finally comprises an additional step for determining the individual bandwidth allocation M-BG[i/a . . . n]q for each of the multicast flows MF[i/a . . . n]q, taking into account the various individual bandwidth allocations VU-BG[I/a]q, . . . , VU-BG[i/n]q distributed for each of the N equivalent virtual unicast flows VUF[i/a]q, . . . , VUF[i/n]q associated with this multicast flow MF[i/a . . . n]q. In one embodiment, the preliminary step of conversion, in each of the input modules ITMi, determines, for each multicast flow MF[i/a . . . n]q, N individual bandwidth request parameters VU-BR[i/a]q, . . . , VU-BR[i/n]q, for said N equivalent virtual unicast flows VUF[i/a]q, . . . , VUF[i/n]q associated with this multicast flow, the values of which are all equal to the value of the individual bandwidth request parameter M-BR[i/a . . . n]q of this multicast flow.

In another embodiment, the individual bandwidth request of each of the various unicast flows U-BR[i/j]p and multicast flows MF[i/a . . . n]q is a parameter having a value that is determined according to the number of cells, belonging to this flow, which are stored in the buffer stores of the input module.

Alternatively, the individual bandwidth request of each of the various unicast flows U-BR[i/j]p and multicast flows MF[i/a . . . n]q can be a parameter having a value that is determined according to a priority indicator assigned to this flow in the input module.

In yet another embodiment, during the additional step of determination, the value of the individual bandwidth allocation M-BG[I/a . . . n]q, for each of the multicast flows MF[i/a . . . n]q, is determined as being at most equal to the smallest value among the N individual bandwidth allocation values VU-BG[I/a]q, . . . , VU BG[i/n]q distributed for each of the N equivalent virtual unicast flows VUF[i/a]q, . . . , VUF[i/n]q associated with this multicast flow MF[i/a . . . n]q.

The invention finally proposes an asynchronous switching node, with n1 input modules ITM1, . . . , ITMi, . . . , ITMn1 interconnected with n2 output modules OTM1, . . . , OTMj, . . . , OTMn2 by a cell switching network, the node having means for implementing this method.

BRIEF DESCRIPTION OF THE DRAWINGS

Other features and advantages of the invention will become apparent from reading the following description of embodiments of the invention, given as a guide only and with reference to the accompanying drawings which show.

DETAILED DESCRIPTION OF EXEMPLARY EMBODIMENTS

To enable use of the internal flow control mechanism for sharing the available switching bandwidth not only for the traffic of cells of unicast flows (UFs), but also for that of multicast flows (MFs), the invention proposes that it be considered that the transfer of a cell of a multicast MF[i/a . . . n]q via the switching network, from an input module ITMi to N recipient output modules OTMa, . . . , OTMn, is equivalent, from the point of view of the traffic, to the simultaneous transfer of N cells of N respective virtual unicast flows VUF[i/a]q, . . . , VUF[i/n]q, from this same input module ITMi to the same recipient output modules OTMa, . . . , OTMn. The N cells of these N virtual unicast flows then correspond to the N copied cells which are in reality generated by the switching network and delivered by this network to the recipient output modules OTMa, . . . , OTMn.

The invention then proposes, prior to the first step of the flow control mechanism, a step for converting, in each of the input modules ITMi, the individual bandwidth request M-BR[i/a . . . n]q of each multicast flow MF[i/a . . . n]q to N individual bandwidth requests VU-BR[i/a]q, . . . , VU-BR[i/n]q for said N equivalent virtual unicast flows VUF[i/a]q, . . . , VUF[i/n]q associated with this multicast flow.

As a result of this conversion, in the flow control mechanism, the first step for preparing a bandwidth request parameter BRi/j per module pair (ITMi/OTMj) is performed by then cumulating, for each of the modules ITMi:

the individual bandwidth requests U-BR[i/j]p of the various real unicast flows UF[i/j]p associated with this module pair, and the individual bandwidth requests VU-BR[i/j]q converted for the various virtual unicast flows VUF[i/j]q, also associated with this module pair, and which correspond to multicast flows MF[i/a . . . n]q having the output module OTMj of this pair among their N recipient output modules.

It is thus possible for the internal flow control mechanism to carry out as normal the second step for sharing and a third step for supplying, based on bandwidth request parameters BRi/j and bandwidth allocation parameters BGi/j, per module pair (ITMi/OTMj), which take account of the traffic of all the real unicast flows UF[i/j]p and virtual unicast flows VUF[i/j]q associated with this module pair. The flow control mechanism therefore operates normally, the existence of multicast flows being hidden, from the point of view of this mechanism, by the conversion of each multicast flow into a plurality of N virtual unicast flows.

Figure 5:
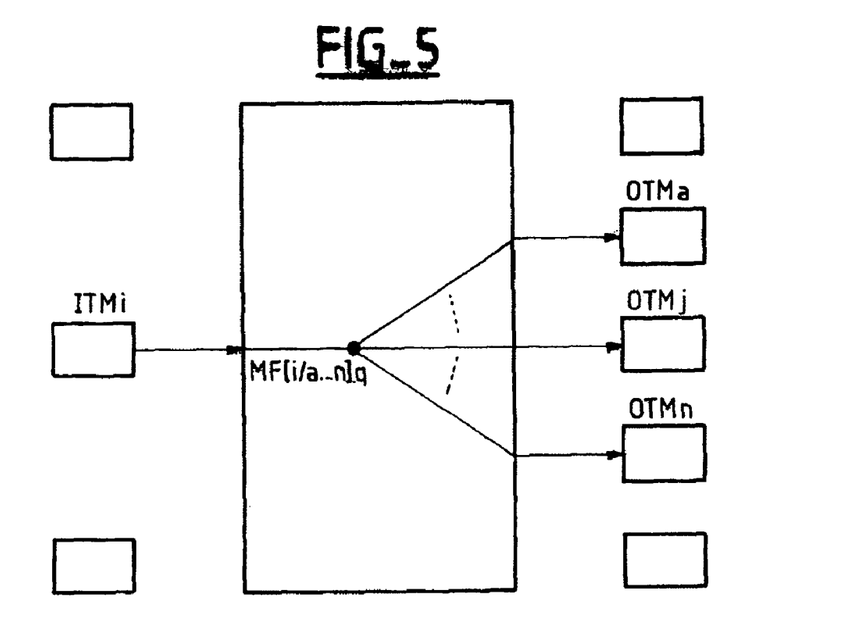
FIG. 5 is a schematic diagram illustrating the principle of a multicast flow in a switching node.
Figure 6:
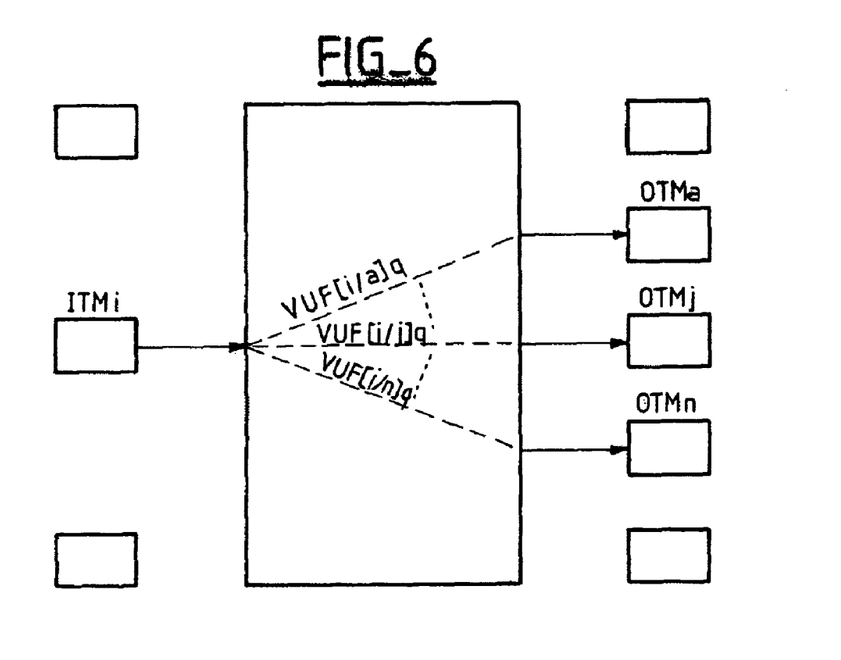
FIG. 6 is a schematic diagram illustrating the principle of virtual unicast flows equivalent to the multicast flow of FIG. 5, according to the invention.

FIG. 5 shows a schematic diagram illustrating the principle of a multicast flow in a switching node, while FIG. 6 shows the plurality of virtual multicast flows equivalent to the multicast flow of FIG. 5. These two figures enable the principle of conversion from multicast flows to virtual unicast flows, equivalent from the traffic point of view, to be understood. FIG. 5 is based on the various elements of FIG. 1—input modules, switching network and output modules. In FIG. 5, a multicast flow, from an input module ITMi to a plurality of N output modules OTMa, . . . , OTMj, . . . , OTMn, is considered. As previously, this multicast flow is denoted by MF[i/a . . . n]q. The figure shows an arrow from the module ITMi to the switching network; the splitting up of this arrow into N arrows inside the switching network represents the fact that the N cells of the multicast flow, which correspond to a cell transmitted by the input module ITMi, are generated by the switching network itself. These N cells are delivered to the N recipient output modules OTMa, . . . , OTMj, . . . , OTMn.

An individual bandwidth request M-BR[i/a . . . n]q is associated with the multicast flow MF[i/a . . . n]q of FIG. 5. As mentioned previously in the case of a unicast flow UF[i/j]p, this individual bandwidth request parameter M-BR[i/a . . . n]q, for a multicast flow present in the input module ITMi, can also have for example a value which is determined according to the number of multicast cells belonging to this flow and which are stored in the buffer stores of the input module. Since the invention is not limited to this example of type of request, an alternative can be to use other types of bandwidth request, for example a type in which the value is determined according to the relative weight of the priority associated with this flow.

FIG. 6 is a schematic diagram of the principle of virtual monocast flows equivalent to the multicast flow of FIG. 5. Within the switching network, each cell of the multicast flow MF[i/a . . . n]q is, as explained above, considered as equivalent to the simultaneous transfer of N cells of N respective virtual unicast flows VUF[i/a]q, . . . , VUF[i/j]q, . . . , VUF[i/n]q, from the input module ITMi to the N recipient output modules OTMa, . . . , OTMn. The figure thus illustrates the simultaneous transfer of N cells of these equivalent virtual unicast flows.

An individual bandwidth request VU-BR[i/j]q is associated with each of these N virtual unicast flows VUF[i/j]q, where j varies from a to n. For a multicast flow, various individual bandwidth requests VU-BR[i/j]q, where j varies from a to n, of equivalent virtual unicast flows are obtained by converting the individual bandwidth request M BR[i/a . . . n]q of the multicast flow. This conversion can, in one embodiment of the invention, consist in assigning each virtual unicast flow VUF[i/j]q an individual bandwidth request VU-BR[i/j]q which is equal to the individual bandwidth request M BR[i/a . . . n]q of the multicast flow to which the virtual unicast flows VUF[i/a]q, . . . , VUF[i/j]q, . . . , VUF[i/n]q are equivalent. This approach amounts to considering that each of the virtual unicast flows that make up a multicast flow exhibit an individual bandwidth request identical to that of the corresponding multicast flow.

FIGS. 5 and 6 therefore both illustrate the principle of considering a multicast flow as a set of virtual unicast flows and the conversion of the individual bandwidth request of the multicast flow into N individual bandwidth requests of equivalent virtual unicast flows.

Figure 7:
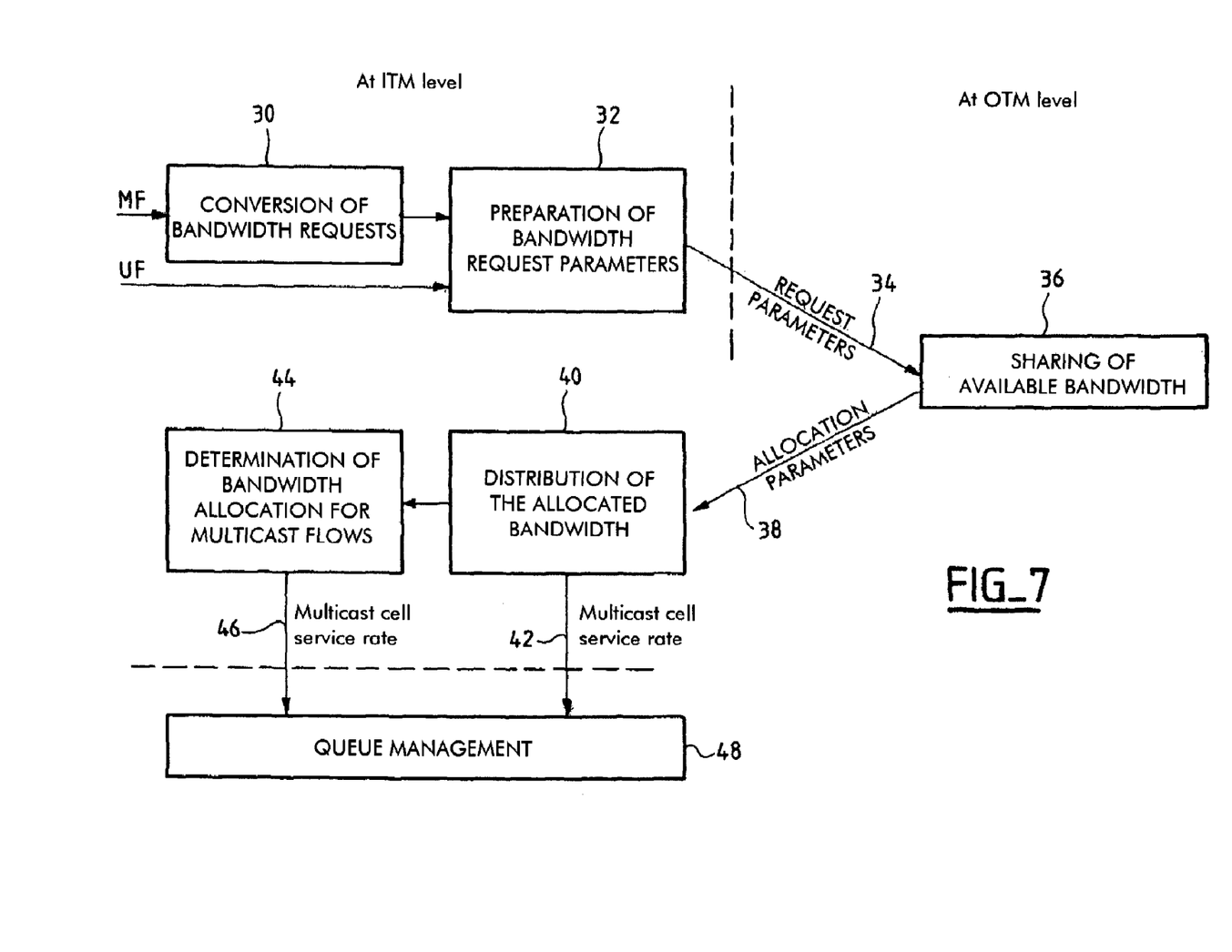
FIG. 7 is a flowchart of the steps implemented according to the invention.

FIG. 7 is a flowchart of the steps implemented according to the invention; some of the steps in FIG. 7 correspond to steps in FIG. 4, but FIG. 7 also shows the steps that characterize the invention. The figure first shows a conversion step, referenced 30. This conversion step takes place before the first step 32 for preparing a bandwidth request parameter per module pair in the flow control mechanism. As FIG. 7 shows, this conversion step 30 is carried out at input module level. It includes, in each of the input modules ITMi, for each multicast flow MF[i/a . . . n]q, the conversion of the individual bandwidth request M-BR[i/a . . . n]q of this multicast flow MF[i/a . . . n]q into N individual bandwidth requests VU-BR[i/a]q, . . . , VU-BR[i/n]q, associated with N virtual unicast flows VUF[i/a]q, . . . , VUF[i/n]q equivalent to this multicast flow. At the output of step 30, for each input module ITMi, the individual bandwidth requests VU BR[i/a]q, . . . , VU-BR[i/n]q of all the virtual unicast flows corresponding to each of the multicast flows coming from the module ITMi are provided.

Step 32 in FIG. 7 corresponds to step 10 in FIG. 4 and forms the first step in the flow control mechanism. At this step, the flow control mechanism prepares for each of the pairs (ITMi, OTMj) of an input module and an output module, a bandwidth request parameter BRi/j per module pair; this parameter is obtained by cumulating:

the individual bandwidth requests U-BR[i/j]p of the various real unicast flows UF[i/j]p associated with this module pair, and the individual bandwidth requests VU-BR[i/j]q converted for the various virtual unicast flows VUF[i/j]q, also associated with this module pair, and which correspond to multicast flows MF[i/a . . . n]q having the input module as source and including the output module OTMj of this pair among their N recipient output modules.

Therefore at the output of step 32, bandwidth request parameters BRi/j are provided for each of the pairs (ITMi, OTMj); these parameters, as the arrow 34 symbolizes, are applied as input for the second step 36 of the flow control mechanism, this step being carried out for each given output module OTMj. This second step is a step for sharing the bandwidth available for all the cell traffic to this output module, that is for the cell traffic of real and virtual unicast flows associated with the various module pairs (ITMi/OTMj) having this same given output module OTMj as destination. It is implemented as step 14 in FIG. 4, the flow control mechanism functioning normally, that is as described earlier with real unicast flows.

The third step of the flow control mechanism is symbolized in FIG. 7 by the arrow 38; as in FIG. 4, it is a step for supplying, to each of the input modules ITMi and for each of the module pairs (ITMi, OTMj), the bandwidth allocation parameter per pair BGi/j. Like the second step, this third step of the flow control mechanism is performed normally, as if the flow control mechanism were handling only real unicast flows.

In terms of traffic, the invention therefore proposes to consider, for a virtual ingress/egress pipe VIEPi/j corresponding to a pair (ITMi, OTMj) of an input module ITMi and an output module OTMj, a traffic of real unicast cells and a traffic of virtual unicast cells corresponding to branches of multicast flows departing from the input module ITMi and including the output module OTMj among their recipient output modules. The decomposition of a multicast flow into a plurality of virtual unicast flows and the conversion of the bandwidth request of this multicast flow means that the second and third steps of the flow control mechanism can be used without modification; the first step is modified only by the determination of bandwidth request parameters per pair, which takes into account the individual bandwidth requests of equivalent virtual unicast flows.

FIG. 7 also shows the fourth step 40 of the method. This fourth step corresponds appreciably to the fourth step 18 in FIG. 4. In each input module ITMi, after reception of the bandwidth allocation parameters per pair supplied at the third step, the flow control mechanism can then distribute the bandwidth allocated per pair BGi/j among the various unicast flows, both real and virtual. Distribution of this bandwidth allocated per pair as individual bandwidth allocation values U-BR[i/j]p for each of the real unicast flows enables, for each of the real unicast flows, a cell service rate SSR[i/j]p to be defined. The solution described here therefore has no effect on the normal operation of the flow control mechanism as regards real unicast flows. The fourth step in FIG. 7 can therefore be implemented without modifications to the flow control mechanism.

Now an example will be described of distributing the bandwidth allocated per pair BGi/j associated with a virtual ingress/egress pipe VIEPi/j corresponding to a pair (ITMi, OTMj) of an input module ITMi and an output module OTMj, as carried out at step 40. In the example, the bandwidth allocated per pair BGi/j is shared in proportion to individual bandwidth requests U-BR[i/j]p, or respectively VU-BR[i/j]q, initially expressed for each of the unicast flows associated with this pair, real unicast flows UF[i/j]p, or respectively virtual multicast flows VUF[i/j]q. For each virtual ingress/egress pipe VIEPi/j, the sum of individual bandwidth requests of real unicast flows and of virtual unicast flows can be denoted by BRi/j, and this is expressed as:

$$BRi/j = \sum_p U - BR[i/j]p + \sum_q VU - BR[i/j]q$$

Using this notation, the distribution into individual bandwidth allocations, performed proportionally to the respective individual bandwidth requests, is expressed as:

for the real unicast flows $U\text{-}BG[i/j]p = BGi/j \times U\text{-}BR[i/j]p/BRi/j$ and for the virtual unicast flows $VU\text{-}BG[i/j]q = BGi/j \times VU\text{-}BR[i/j]q/BRi/j$ This distribution rule which can be used at step 40 in FIG. 7 applies for all possible forms of bandwidth requests, in particular for bandwidth requests as expressed by parameters of the type mentioned earlier by way of example, the value of which is determined according to the number of cells belonging to this flow and stored in the buffer stores of the input module, or determined according to the relative weight of the priority associated with this flow. Naturally rules for distributing the bandwidth allocated per pair can be used other than the rule of distributing proportionally to the individual bandwidth requests, which has just been proposed as an example.

At the end of the fourth step, an individual bandwidth is allocated to each of the real unicast flows. As arrow 42 toward the queue management mechanism shows, this individual allocated bandwidth is used to determine the cell service rate SSR[i/j]p for each of these real unicast flows, in a similar way to that which is proposed in FIG. 4.

FIG. 7 also shows an additional step 44 for determining individual bandwidth allocation for each of the multicast flows. This step for determining the individual bandwidth allocated M-BG[I/a . . . n]q to a multicast flow MF[i/a . . . n]q is performed by taking account of the various individual bandwidth allocations carried out at step 40 for each of the N virtual unicast flows that make up this multicast flow. In other words, for each multicast flow MF[i/a . . . n]q, the individual allocated bandwidth M-BG[i/a . . . n]q is a function of the various individual bandwidths VU BG[i/a]]q, . . . , VU-BG[i/n]q allocated to the various virtual unicast flows VUF[i/a]q, . . . , VUF[i/n]q that make up the multicast flow.

Therefore at the output of the additional step 44, for each multicast flow MF[i/a . . . n]q, an individual allocated bandwidth M-BG[i/a . . . n]q is provided. This allocated bandwidth value can then, as the arrow 46 symbolizes, be transmitted to a queue management mechanism 48 to determine the cell service rate SSR[i/a . . . n]q for each multicast flow.

More specifically, the additional step 44 can be carried out as follows: for each multicast flow MF[i/a . . . n]q, the individual allocated bandwidth M-BG[i/a . . . n]q is less than or equal to the lowest value of individual allocated bandwidths VU BG[i/a]q, . . . , VU-BG[i/n]q distributed at step 40 for the various virtual unicast flows VUF[i/a]q, . . . , VUF[i/n]q that make up the multicast flow. This solution amounts to imposing that the actual traffic of cells copied by the switching network on each of the N branches of a multicast flow does not exceed the bandwidth allocated for any one of these N branches. In other words, when the cells are copied in the switching network itself, the cell traffic in a multicast flow is limited by the bandwidth acceptable on the multicast flow branch for which the allocated bandwidth is the lowest. This can be expressed as, for any multicast flow MF[i/a . . . n]q:

$$M\text{-}BG[i/a \ldots n]q \leq Min\{VU\text{-}BG[i/a]q, \ldots, VU\text{-}BG[i/n]q\} \quad (40)$$

or, for the highest possible value of bandwidth allocated to each multicast flow:

$$M\text{-}BG[i/a \ldots n]q = Min\{VU\text{-}BG[i/a]q, \ldots, VU\text{-}BG[i/n]q\} \quad (45)$$

This additional step 44, in a way the reverse of the preliminary conversion step, thus enables bandwidth allocation to be applied by the flow control mechanism not only to unicast flows but also to multicast flows.

The method of the invention, by considering a multicast flow as a plurality of virtual unicast flows, enables the bandwidth available in an asynchronous switching node to be shared not only between unicast flows but also between multicast flows. The invention allows the existing flow control mechanisms to be used by simply adding a preliminary step for converting the individual bandwidth request of a multicast flow to individual bandwidth requests of virtual unicast flows that are equivalent to it, and an additional step for determining the individual bandwidth allocated to a multicast flow from individual bandwidths allocated to the virtual unicast flows that are equivalent to it.

From the point of view of a switching node, the method can be implemented by providing at input module level a circuit for converting the individual bandwidth request of a multicast flow to individual bandwidth requests of virtual unicast flows that are equivalent to it and a circuit for determining the individual bandwidth allocated to a multicast flow from individual bandwidths allocated to the virtual unicast flows that are equivalent to it.

As is clearly apparent to the person skilled in the art, these circuits can involve hardware means, in particular processors and memories, and suitable software means.

The invention claimed is:

1. A method for sharing the available switching bandwidth for transferring cells of unicast and multicast flows in an asynchronous switching node, the method comprising:

n1 input modules (ITM1, . . . , ITMi, . . . , ITMn1) are interconnected with n2 output modules (OTM1, . . . , OTMj, . . . , OTMn2) by a cell switching network which transfers each cell from an input module to at least one output module;

said cell switching network routes a cell transmitted by an input module to a single given recipient output module (OTMd) in the case of a cell of a unicast flow, and to N given recipient output modules (OTMa, . . . , OTMn), among the n2 output modules of the node, in the case of a cell of a multicast flow, said cell switching network generating the corresponding N copied cells from the cell transmitted by an input module for the multicast flow;

each input module is equipped with buffer stores for temporarily storing cells of said unicast and multicast flows, and the departure of said stored cells from said buffer stores to said switching network is controlled at service times that depend on a cell service rate attributed to each of the flows of cells;

an internal flow control mechanism performs a first step for preparing a bandwidth request parameter (BRi/j) for each of the module pairs (ITMi/OTMj) relating to a given input module (ITMi) and a given output module (OTMj), by cumulating the various individual bandwidth requests (U BR[i/j]p) of the various unicast flows (UF[i/j]p) associated with this module pair, then a second step for sharing, for each given output module (OTMj), the bandwidth available for the cell traffic from all the unicast flows having this same given output module (OTMj) as recipient, according to the respective bandwidth request parameters (BRi/j) prepared for the various module pairs (ITMi, OTMj) having this same given output module (OTMj) as recipient, then a third step for supplying, to each of the input modules (ITMi) and for each of the module pairs (ITMi/OTMj), a bandwidth allocation parameter (BGi/j), and finally a fourth step for distribution, for each of the module pairs (ITMi, OTMj), determining, based on the bandwidth allocation parameter (BGi/j) for this pair, the individual bandwidth allocation (U-BG[i/j]p) distributed for each of the unicast flows (UF[i/j]p) associated with this pair, this bandwidth allocation (U-BG[i/j]p) forming said cell service rate (SSR[i/j]p) attributed to each of these flows;

wherein the transfer of a cell of a multicast flow (MF[i/a . . . n]q) via the switching network to N given recipient output modules (OTMa, . . . , OTMn) is considered as being equivalent to the simultaneous transfer of N cells of N respective virtual unicast flows (VUF[i/a]q, . . . , VUF[i/n]q) to these same N recipient output modules (OTMa, . . . , OTMn);

wherein the method further comprises a fifth step for converting before said first step, in each of the input modules (ITMi), the individual bandwidth request (M BR[i/a . . . n]q) of each multicast flow (MF[i/a . . . n]q) to N individual bandwidth requests (VU-BR[i/a]q, . . . , VU-BR[i/n]q) associated with said N equivalent virtual unicast flows (VUF[i/a]q, . . . , VUF[i/n]q) associated with this multicast flow;

wherein said first step for preparing, for each of the module pairs (ITMi, OTMj), a bandwidth request parameter (BRi/j) is performed therefore by cumulating the individual bandwidth requests (U-BR[i/j]p) of the various real unicast flows (UF[i/j]p) associated with this module pair, and the individual bandwidth requests (VU-BR[i/j]q) converted for the various virtual unicast flows (VUF[i/j]q), also associated with this module pair;

wherein said internal flow control mechanism performs said second step of sharing and third step of supplying, based on bandwidth request parameters (BRi/j) and bandwidth allocation parameters (BGi/j), per module pair (ITMi/OTMj), thus obtained;

wherein said fourth step of distribution, of said internal flow control mechanism, then determines, based on each of the bandwidth allocation parameters (BGi/j) per module pair, the individual bandwidth allocation (U BG[i/j]p) distributed for each of the real unicast flows (UF[i/j]p) associated with this pair, and the individual bandwidth allocation (VU-BG[i/j]q) distributed for each of the virtual unicast flows (VUF[i/j]q), also associated with this module pair, which correspond to multicast flows (MF[i/a . . . n]q) having the output module (OTMj) of this pair among its N recipient output modules; and wherein the method further comprises a sixth step for determining the individual bandwidth allocation (M-BG[i/a . . . n]q) for each of the multicast flows (MF[i/a . . . n]q), taking into account the various individual bandwidth allocations (VU-BG[I/a]q, VU-BG[i/n]q) distributed for each of the N equivalent virtual unicast flows (VUF[i/a]q, VUF[i/n]q) associated with this multicast flow (MF[i/a . . . n]q).

2. The method according to claim 1, wherein said preliminary step of conversion, in each of the input modules (ITMi), determines, for each multicast flow (MF[i/a . . . n]q), N individual bandwidth request parameters (VU BR[i/a]q, . . . , VU-BR[i/n]q), for said N equivalent virtual unicast flows (VUF[i/a]q, . . . , VUF[i/n]q) associated with this multicast flow, the values of which are all equal to the value of the individual bandwidth request parameter (M-BR[i/a . . . n]q) of this multicast flow.

3. The method according to claim 1, characterized in that said individual bandwidth request of each of the various unicast flows (U-BR[i/j]p) and multicast flows (MF[i/a . . . n]q) is a parameter having a value that is determined according to the number of cells, belonging to this flow, which are stored in the buffer stores of the input module.

4. The method according to claim 1, characterized in that said individual bandwidth request of each of the various unicast flows (U-BR[i/j]p) and multicast flows (MF[i/a . . . n]q) is a parameter having a value that is determined according to a priority indicator assigned to this flow in the input module.

5. The method according to claim 1, characterized in that, during said sixth step of determination, the value of the individual bandwidth allocation (M BG[I/a . . . n]q), for each of the multicast flows (MF[i/a . . . n]q), is determined as being at most equal to the smallest value among the N individual bandwidth allocation values (VU-BG[I/a]q, . . . , VU-BG[i/n]q) distributed for each of the N equivalent virtual unicast flows (VUF[i/a]q, . . . , VUF[i/n]q) associated with this multicast flow (MF[i/a . . . n]q).

6. An asynchronous switching node, with n1 input modules interconnected with n2 output modules by said cell switching network implementing the method according to any one of claims 1 to 5.

* * * * *